United States Patent
Sakashita et al.

(10) Patent No.: US 9,695,724 B2
(45) Date of Patent: Jul. 4, 2017

(54) HONEYCOMB CATALYST BODY

(71) Applicant: NGK INSULATORS, LTD., Nagoya (JP)

(72) Inventors: Satoshi Sakashita, Nagoya (JP); Norihiro Wakida, Nagoya (JP); Risyun Kin, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 154 days.

(21) Appl. No.: 14/160,828

(22) Filed: Jan. 22, 2014

(65) Prior Publication Data

US 2014/0205509 A1 Jul. 24, 2014

Related U.S. Application Data

(60) Provisional application No. 61/755,621, filed on Jan. 23, 2013.

(51) Int. Cl.
| | |
|---|---|
| *B01D 50/00* | (2006.01) |
| *F01N 3/20* | (2006.01) |
| *F01N 3/28* | (2006.01) |
| *B01D 46/24* | (2006.01) |
| *B28D 5/04* | (2006.01) |
| *B01J 35/04* | (2006.01) |

(52) U.S. Cl.
CPC ............ *F01N 3/20* (2013.01); *B01D 46/2455* (2013.01); *F01N 3/2828* (2013.01); *B01J 35/04* (2013.01); *B28D 5/047* (2013.01); *F01N 2330/06* (2013.01); *F01N 2330/30* (2013.01); *F01N 2330/38* (2013.01)

(58) Field of Classification Search
CPC ............ B01N 2330/30; F01N 2330/38; F01N 3/2828; F01N 3/20; B28D 5/047
USPC .................................. 422/177, 180
See application file for complete search history.

(56) References Cited

U.S. PATENT DOCUMENTS

| | | | | |
|---|---|---|---|---|
| 5,063,029 A | * | 11/1991 | Mizuno | B01J 35/0033 219/552 |
| 5,533,167 A | * | 7/1996 | Kondo | B01D 53/9454 219/552 |

(Continued)

FOREIGN PATENT DOCUMENTS

| | | |
|---|---|---|
| JP | H11-290699 A | 10/1999 |
| JP | 2001-179110 A1 | 7/2001 |

(Continued)

OTHER PUBLICATIONS

German Office Action (With English Translation), German Application No. 10 2014 000 756.1, dated Apr. 21, 2016 (8 pages).

(Continued)

*Primary Examiner* — Tom P Duong
(74) *Attorney, Agent, or Firm* — Burr & Brown, PLLC

(57) ABSTRACT

A honeycomb catalyst body includes a tubular honeycomb base material having porous partition walls to define and form a plurality of cells extending as through channels of a fluid from one end surface from which the fluid flows in to the other end surface from which the fluid flows out, and a catalyst loaded onto the partition walls. In the honeycomb base material, at least one slit which is open in a side surface of the honeycomb base material is formed, and a width of the slit is from 1.0 to 10.0 mm.

9 Claims, 4 Drawing Sheets

(56) References Cited

U.S. PATENT DOCUMENTS

2003/0202917 A1* 10/2003 Ashida ............... B01D 53/9486
422/180
2003/0202918 A1   10/2003 Ashida et al.
2007/0248507 A1   10/2007 Ashida et al.

FOREIGN PATENT DOCUMENTS

| JP | 2004-025139 A  | 1/2004 |
| JP | 2004-025139 A1 | 1/2004 |
| JP |     4239469 B2 | 3/2009 |
| JP | 2011-194318 A  | 10/2011 |

OTHER PUBLICATIONS

Japanese Office Action, Japanese Application No. 2014-008968, dated Aug. 2, 2016 (2 pages).

* cited by examiner

HONEYCOMB CATALYST BODY

The present invention relates to a honeycomb catalyst body, and more particularly, it relates to a honeycomb catalyst body having excellent purification performance.

DESCRIPTION OF RELATED ART

Field of the Invention

The present invention relates to a honeycomb catalyst body, and more particularly, it relates to a honeycomb catalyst body having an excellent purification performance.

Background Art

Heretofore, for the purpose of purifying exhaust gases discharged from various engines and the like, a honeycomb catalyst body has been used in which a catalyst is loaded onto a honeycomb structure.

Furthermore, there has been investigated a honeycomb catalyst body in which slits are formed in a carrier to generate a turbulence in part of a flow of an exhaust gas, thereby enhancing a contact efficiency between a catalyst and the exhaust gas (e.g., see Patent Documents 1 to 3).

[Patent Document 1] JP-A-2001-179110
[Patent Document 2] JP-A-2004-25139
[Patent Document 3] JP 4239469

SUMMARY OF THE INVENTION

There has been the problem that a sufficient purification performance cannot necessarily be obtained even from a honeycomb catalyst body in which slits are formed in a carrier.

The present invention has been developed in view of the above-mentioned problem. That is, an object of the present invention is to provide a honeycomb catalyst body having an excellent purification performance.

According to a first aspect of the present invention, a honeycomb catalyst body including: a tubular honeycomb base material having porous partition walls to define and form a plurality of cells extending as through channels of a fluid from one end surface from which the fluid flows in to the other end surface from which the fluid flows out is provided; and a catalyst loaded onto the partition walls, wherein in the honeycomb base material, at least one slit which is open in a side surface of the honeycomb base material is formed, and a width of the slit is from 1.0 to 10.0 mm.

According to a second aspect of the present invention, the honeycomb catalyst body according to the above first aspect is provided, wherein the width of the slit is from 2.5 to 10.0 mm.

According to a third aspect of the present invention, the honeycomb catalyst body according to the above first or second aspects is provided, wherein a total of slit areas which are areas of portions cut by the slits in the honeycomb base material is 0.4 times or more and less than 11.0 times as much as an area of a cross section of the honeycomb base material which is perpendicular to an extending direction of the cells.

According to a fourth aspect of the present invention, the honeycomb catalyst body according to any one of the above first to third aspects is provided, wherein slit areas of the slits formed in a region from the one end surface from which the fluid flows in to a central portion in the extending direction of the cells are ⅔ or more of a total of slit areas of all the slits.

According to a fifth aspect of the present invention, the honeycomb catalyst body according to any one of the above first to third aspects is provided, wherein slit areas of the slits formed in a region from the other end surface from which the fluid flows out to a central portion in the extending direction of the cells are ⅔ or more of a total of slit areas of all the slits.

In a honeycomb catalyst body of the present invention, a slit each having a width of 1.0 to 10.0 mm is formed in a honeycomb base material, and hence the honeycomb catalyst body has an excellent purification performance.

DETAILED DESCRIPTION OF THE INVENTION

Hereinafter, an embodiment of the present invention will specifically be described with reference to the drawings. The present invention is not limited to the following embodiment. It should be understood that the following embodiment to which change, improvement or the like is suitably added on the basis of ordinary knowledge of a person skilled in the art without departing from the gist of the present invention falls in the scope of the present invention.

Figure 1:
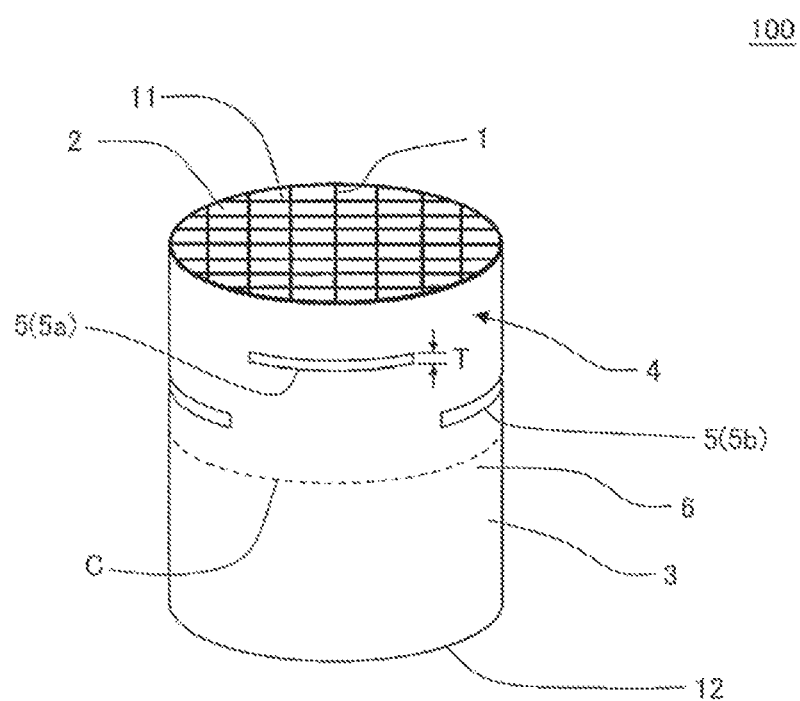
FIG. 1 is a perspective view schematically showing one embodiment of a honeycomb catalyst body of the present invention.
Figure 2:
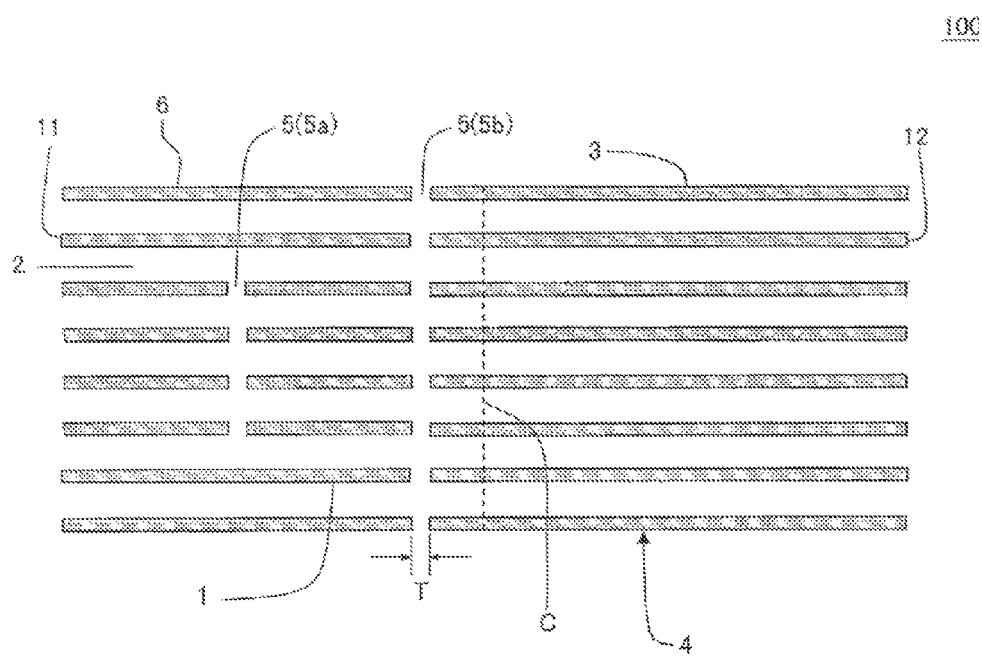
FIG. 2 is a schematic view showing a cross section parallel to a cell extending direction in the one embodiment of the honeycomb catalyst body of the present invention.
Figure 3:
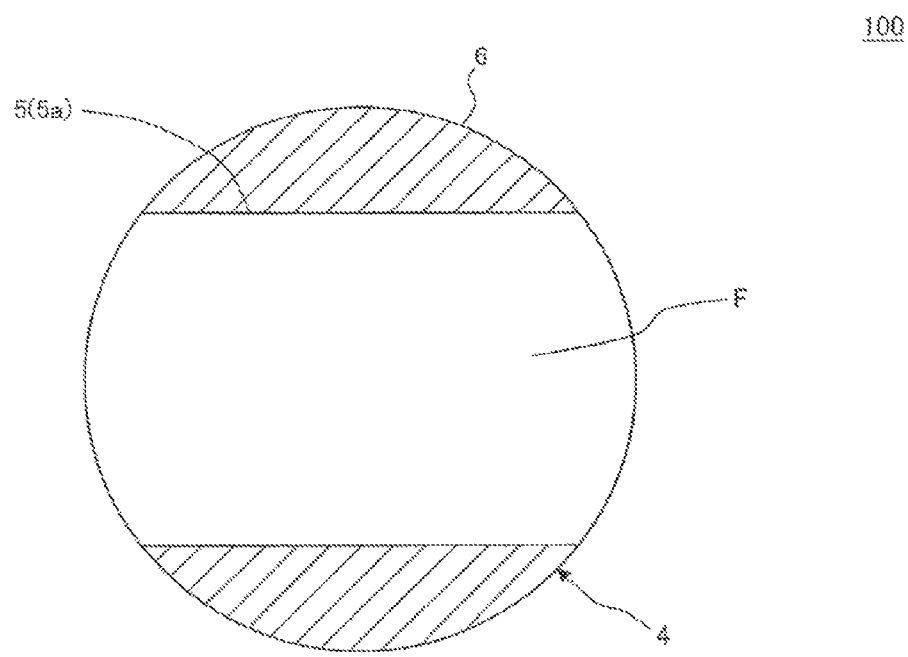
FIG. 3 is a schematic sectional view of a portion of a slit cut by flat surfaces perpendicular to the cell extending direction in the one embodiment of the honeycomb catalyst body of the present invention.
Figure 4:
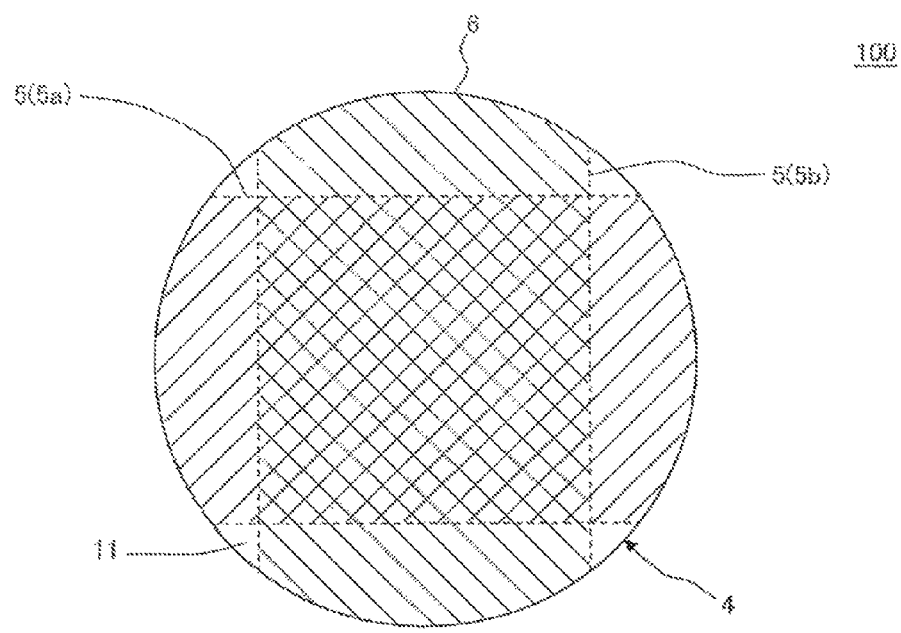
FIG. 4 is a plan view of the one embodiment of the honeycomb catalyst body of the present invention.

(1) Honeycomb Catalyst Body:

One embodiment of a honeycomb catalyst body of the present invention includes a tubular honeycomb base material 4 and a catalyst, as shown in FIG. 1 to FIG. 4. The tubular honeycomb base material 4 has porous partition walls 1 to define and form a plurality of cells 2 extending as through channels of a fluid from one end surface (an inflow end surface) 11 from which the fluid flows in to the other end surface (an outflow end surface) 12 from which the fluid flows out. A catalyst is loaded onto the partition walls 1. Furthermore, in a honeycomb catalyst body 100 of the present embodiment, in the honeycomb base material 4, slits 5(a) and 5(b) which are open in a side surface 6 of the honeycomb base material 4 are formed. Two slits 5 are formed, but at least one slit may be formed. Furthermore, a width T of the slits 5 is from 1.0 to 10.0 mm. The honeycomb catalyst body 100 of the present embodiment has an outer peripheral wall 3 in the outermost periphery. Moreover, when the honeycomb catalyst body 100 has the outer peripheral wall 3, the side surface 6 is the surface of the outer peripheral wall 3. FIG. 1 is a perspective view schematically showing the one embodiment of the honeycomb catalyst body of the present invention. FIG. 2 is a schematic view showing a cross section parallel to an extending direction of the cells 2 in the one embodiment of the honeycomb catalyst body of the present invention. FIG. 3 is a schematic sectional view of a portion of the slit 5 (5a) cut by flat surfaces perpendicular to the cell extending direction in the one embodiment of the honeycomb catalyst body of the present invention. FIG. 4 is a plan view of the one embodiment of the honeycomb catalyst body of the present invention. It is to be noted that in FIG. 3 and FIG. 4, the cells and the partition walls are omitted.

In this way, in the honeycomb catalyst body 100 of the present embodiment, the slits each having the width T of 1.0 to 10.0 mm are formed in the honeycomb base material 4, and hence the honeycomb catalyst body has an excellent purification performance. When the width T is smaller than 1.0 mm, the slits 5 are unfavorably closed with the catalyst. When the width T is larger than 10.0 mm, a volume of the slits 5 is large, and an area of the partition walls 1 onto which the catalyst is loaded is unfavorably small. The width T of the slits 5 is preferably from 2.5 to 10.0 mm. When the width T is 2.5 mm or more, the honeycomb catalyst body has a further excellent purification performance. It is to be noted that when the catalyst is loaded in the slits 5, "the width T of the slit 5" is a width of a spatial portion of the slits 5 in a state where the catalyst is loaded.

In the honeycomb catalyst body 100 of the present embodiment, a total of slit areas which are areas of portions cut by the slits 5 in the honeycomb base material 4 is preferably 0.4 times or more and less than 11.0 times as much as an area of a cross section of the honeycomb base material 4 which is perpendicular to the extending direction of the cells 2. Here, "the slit area" is an area of a surface (a slit inner end surface) exposed in the slits 5 of the honeycomb base material 4 on a fluid inflow side, and is an area of a portion shown by a slit inner end surface F in FIG. 3. The slit inner end surface F is an end surface which faces the inside of the slit 5, and is a surface positioned in the slit 5 on the side of "the outflow end surface 12".

In the honeycomb catalyst body 100 of the present embodiment, slit areas of the slits 5 formed in a region from the one end surface 11 from which the fluid flows in to a central portion C in the extending direction of the cells 2 are preferably ⅔ or more of a total of slit areas of all the slits 5. Furthermore, in the honeycomb catalyst body 100 of the present embodiment, slit areas of the slits 5 formed in a region from the other end surface 12 from which the fluid flows out to the central portion C in the extending direction of the cells 2 may be ⅔ or more of the total of the slit areas of all the slits 5.

In the honeycomb catalyst body 100 of the present embodiment, a material of the honeycomb base material 4 is preferably a ceramic material. There is not any special restriction on a size and a shape of the honeycomb base material 4. Furthermore, there is not any special restriction on a partition wall thickness, a cell density, a partition wall porosity, and an average pore diameter of the partition walls.

In the honeycomb catalyst body 100 of the present embodiment, there is not any special restriction on the catalyst to be loaded onto the honeycomb base material 4. Examples of the catalyst include an oxidation catalyst, a reduction catalyst, a three way catalyst (TWC), an $NO_x$ adsorber catalyst, and a selective catalyst reduction (SCR) catalyst. These catalysts may be used together.

(2) Manufacturing Method of Honeycomb Catalyst Body

There is not any special restriction on a manufacturing method of the honeycomb catalyst body of the present invention, but the honeycomb catalyst body can be manufactured, for example, by the following method.

First, a forming raw material containing a ceramic raw material is preferably kneaded to prepare a tubular kneaded material. At this time, as the ceramic raw material group, for example, at least one selected from the following "raw material group" is preferable as the ceramic raw material.

"The raw material group" is "the group consisting of silicon carbide, a silicon-silicon carbide composite material, a cordierite forming raw material, cordierite, mullite, alumina, spinel, a silicon carbide-cordierite composite material, lithium aluminum silicate, and aluminum titanate".

Moreover, the forming raw material is preferably prepared by mixing the above ceramic raw material with water, a pore former, a binder, a dispersant, a surfactant and the like. There is not any special restriction on the order of the mixing.

As to the pore former, the binder, the dispersant, the surfactant and the like, there can be used additives usually used in the manufacturing of an exhaust gas purifying ceramic honeycomb structure (a honeycomb filter or the honeycomb catalyst body).

There is not any special restriction on a method of kneading the forming raw material to form the kneaded material having a tubular shape such as a columnar shape, and an example of the method is a method using a kneader, a vacuum clay kneader or the like.

Next, the kneaded material is preferably extruded to obtain a formed honeycomb body. There is not any special restriction on a method of extruding the kneaded material to obtain the formed honeycomb body, and the formed honeycomb body can be obtained by using a device such as the vacuum clay kneader, a ram type extrusion-forming machine, or a biaxial screw type continuous extrusion-forming machine. Furthermore, such a die as to obtain the formed honeycomb body of a desired partition wall thickness, cell density, cell shape and the like is preferably attached to the device for use in the extrusion-forming, to perform the extrusion-forming.

After obtaining the formed honeycomb body, the obtained formed honeycomb body is preferably dried. There is not any special restriction on a drying method, but examples of the method include hot air drying, microwave drying, dielectric drying, reduced pressure drying, vacuum drying, and freeze-drying. Among these methods, dielectric drying, microwave drying, hot air drying, or any combination of drying methods is preferably performed, because the whole formed honeycomb body can rapidly and evenly be dried. Furthermore, drying conditions can suitably be determined in accordance with the drying method.

Next, the formed honeycomb body is preferably fired to prepare "the honeycomb base material prior to the formation of the slits". Firing conditions are preferably conditions suitable for each material. Moreover, prior to the firing, calcination is preferably performed. The calcination is performed for the purpose of degreasing. There is not any special restriction on a calcinating method, as long as organic materials (the binder, the dispersant, the pore former, etc.) in the formed honeycomb body can be removed.

Next, the slits are preferably formed in "the honeycomb base material prior to the formation of the slits" to form the honeycomb base material. There is not any special restriction on a method of forming the slits, but it is preferable to use, for example, an ultrasonic cutter or the like. Slit forming conditions are the same as the conditions of the slits in the above honeycomb catalyst body of the present invention.

Next, the catalyst is preferably loaded onto the honeycomb base material to prepare the honeycomb catalyst body. As a method of loading the catalyst onto the honeycomb base material, a method is preferable in which the honeycomb base material is wash-coated with a catalyst liquid, the catalyst liquid in the slits is blown and flown by air, and then a heat treatment is performed to carry out baking. However, the method is not limited to this example. As the catalyst, a catalyst is preferable which is considered to be preferable in the above honeycomb catalyst body of the present invention.

EXAMPLES

A pore former, an organic binder and water were added to a cordierite forming raw material to obtain a forming raw material. The forming raw material was mixed and kneaded to prepare a columnar kneaded material. As the organic binder, methylcellulose was used, and 5.0 parts by mass of the organic binder were added to 100 parts by mass of the cordierite forming raw material. The water was added as a dispersion medium as much as 37 mass % of the whole forming raw material. The cordierite forming raw material is a raw material which is fired to become cordierite. Specifically, the raw material is a ceramic raw material obtained by mixing "predetermined raw materials" so as to have a chemical composition in which silica ($SiO_2$) falls in a range of 42 to 56 mass %, alumina ($Al_2O_3$) falls in a range of 30 to 45 mass % and magnesia (MgO) falls in a range of 12 to 16 mass %. "The predetermined raw materials" are raw materials selected from the group consisting of talc, kaolin, calcinated kaolin, alumina, aluminum hydroxide, and silica.

Next, the kneaded material was extruded by using a predetermined die, to obtain a formed honeycomb body including partition walls to define and form a plurality of cells, and an outer peripheral wall. In the formed honeycomb body, a cell shape (a shape of the cells in a cross section perpendicular to an extending direction of the cells) was square, and the whole shape was a cylindrical shape.

Next, the obtained formed honeycomb body was dried at 120° C. for one hour, and then fired at 1400 to 1430° C. for ten hours to prepare a honeycomb base material prior to formation of slits.

Next, three slits were formed in the obtained "honeycomb base material prior to the formation of the slits", to obtain the honeycomb base material. The slits were formed by using an ultrasonic cutter. Moreover, the slits were disposed via an equal space, and a slit width was 3 mm. Furthermore, the slits were formed so that the respective slits crossed at 90°, when seen from a central axis direction of the honeycomb base material. Additionally, the slits were formed in parallel with an end surface of the honeycomb base material (a width direction of the slits was the same as the extending direction of the cells of the honeycomb base material).

Next, a catalyst was loaded onto the obtained honeycomb base material, to prepare a honeycomb catalyst body. As the catalyst, a three way catalyst (TWC) was used. A method of loading the catalyst onto the honeycomb base material was a method in which the honeycomb base material was washcoated with a catalyst liquid, the catalyst liquid in the slits was blown and flown by air, and then a heat treatment was performed at 550° C. to carry out baking.

A porosity of the obtained honeycomb catalyst body was 35%. The porosity and an average pore diameter are values measured by a mercury porosimeter. Moreover, the slit width was 3 mm. Furthermore, an amount of the catalyst to be loaded was 200 g/liter. Additionally, a partition wall thickness was 88.9 and a cell density was 93 cells/$cm^2$. Moreover, the obtained honeycomb catalyst body had a cylindrical shape in which a diameter of a bottom surface was 106 mm, and a length in the cell extending direction was 114 mm. A total of "slit areas" as "areas of portions cut by the slits in the honeycomb base material" was 1.3 times as much as an area of "the cross section" of the honeycomb base material which was "perpendicular to the cell extending direction".

As to the obtained honeycomb catalyst body, "durability" and "purification performance" were measured by the following methods. The results are shown in Table 1. In Table 1, a column of "a cell structure" indicates "the partition wall thickness (μm)/the cell density (cells/$cm^2$)". "φ" in a column of "a size" means "a diameter (mm) of the bottom surface of the honeycomb catalyst body". Moreover, "L" in the column of "the size" indicates "the length (mm) of the honeycomb catalyst body in the cell extending direction". A column of "a slit position" indicates a position where the slits are formed (slit arrangement). "The equal space" in the column of "the slit position" means that the cells are arranged so as to equally divide the honeycomb catalyst body in the extending direction of the cells of the honeycomb catalyst body. Furthermore, "concentration on inflow side" in the column of "the slit position" means a state where "all the slits are formed in a region from one end surface of the honeycomb catalyst body from which a fluid flows in to a central portion thereof in the cell extending direction". Additionally, "concentration on outflow side" in the column of "the slit position" means a state where "all the slits are formed in a region from the other end surface of the honeycomb catalyst body from which the fluid flows out to the central portion thereof in the cell extending direction". A column of "the cell shape" indicates the shape of the cells in the cross section perpendicular to the cell extending direction. In the column of "the cell shape", "an octagon+a quadrangle" indicates a state where octagonal cells each having a large area and quadrangular cells each having a small area are alternately arranged. "TWC" in a column of "the catalyst" means the three way catalyst. Furthermore, "an $NO_x$ adsorber catalyst+TWC" in the column of "the catalyst" means that the $NO_x$ adsorber catalyst and the three way catalyst are mixed and loaded. Additionally, a column of "the porosity" indicates the porosity of the partition walls. A column of ""the slit area"/"the sectional area of the base material"" indicates the number of times of the total of "the slit areas" to "the area of the cross section of the honeycomb base material which is perpendicular to the cell extending direction".

(Purification Performance)

A purification ratio of hydrocarbons in a running mode "LA-4-mode" was measured, to obtain a purification performance. Specifically, "a concentration of hydrocarbons prior to the inflow into the honeycomb catalyst body" and "a concentration of hydrocarbons discharged from the honeycomb catalyst body" were measured. Then, the purification ratio of hydrocarbons was obtained. Then, when enhancement of the purification ratio was notably larger than 35% with respect to a reference value (35% of the reference value), "AA" evaluation was obtained. Moreover, when the enhancement of the purification ratio was in excess of 20% and 35% or less of the reference value, "A" evaluation was obtained. Furthermore, when the enhancement of the purification ratio was in excess of 5% and 20% or less of the reference value, "B" evaluation was obtained. Additionally, when the enhancement of the purification ratio was 5% or less of the reference value, "C" evaluation was obtained. The "C" evaluation was regarded as failure. Furthermore, the "AA" evaluation was the best evaluation, the "A" evaluation was the next good evaluation, and the "B" evaluation was a good evaluation next to the "A" evaluation.

In the evaluation of the purification performance of each of Examples 1 to 14 and Comparative Examples 2 and 3, the purification ratio of Comparative Example 1 was the above "reference value". In the evaluation of the purification performance of each of Examples 15 to 22, the purification ratio of each of the Comparative Examples 4 to 11 was successively the above "reference value". For example, "the reference value" in the evaluation of the purification performance of Example 15 was the purification ratio of Comparative Example 4.

(Durability)

A hot vibration test was carried out as a durability test to confirm the presence/absence of damage. Specifically, "an operation of giving a vibration of 30 G to the honeycomb catalyst body at temperature conditions of 1000° C. for 20 minutes, and then giving the vibration of 30 G to the honeycomb catalyst body at temperature conditions of 500° C. for 20 minutes" was "a repeating unit", and this "repeating unit" was repeated for 100 hours. According to this test, a case where there were not any damages was "OK", and a case where there were the damages was "NG". "OK" was pass, and "NG" was failure.

Examples 2 to 22 and Comparative Examples 1 to 11

Honeycomb catalyst bodies were prepared in the same manner as in Example 1, except that respective conditions were changed as shown in Table 1. In the same manner as in Example 1, "durability" and "purification performance" were measured. The results are shown in Table 1.

A honeycomb catalyst body of the present invention can suitably be utilized in purification of exhaust gases discharged from various engines and the like.

DESCRIPTION OF REFERENCE SYMBOLS

1: partition wall, 2: cell, 3: outer peripheral wall, 4: honeycomb base material, 5, 5(*a*) and 5(*b*): slit, 11: one end surface, 12: the other end surface, 100: honeycomb catalyst body, T: width (the width of the slit), F: slit inner end surface, and C: central portion.

TABLE 1

| | Cell structure (μm)/ (cells/cm²) | Size (mm) × (mm) | Slit position | Cell shape | Catalyst | Porosity (%) | "Slit area"/ "base material sectional area" | Slit width (mm) | Durability | Purification performance |
|---|---|---|---|---|---|---|---|---|---|---|
| Comparative Example 1 | 88.9/93.0 | φ106 × 114L | — | Quadrangular | TWC | 35 | 0 | — | OK | — |
| Example 1 | 88.9/93.0 | φ106 × 114L | Equal space | Quadrangular | TWC | 35 | 0.3 | 3 | OK | B |
| Example 2 | 88.9/93.0 | φ106 × 114L | Equal space | Quadrangular | TWC | 35 | 0.4 | 3 | OK | B |
| Example 3 | 88.9/93.0 | φ106 × 114L | Equal space | Quadrangular | TWC | 35 | 10 | 3 | OK | A |
| Example 4 | 88.9/93.0 | φ106 × 114L | Equal space | Quadrangular | TWC | 35 | 11 | 3 | NG | B |
| Comparative Example 2 | 88.9/93.0 | φ106 × 114L | Equal space | Quadrangular | TWC | 35 | 5 | 0.5 | OK | C |
| Example 5 | 88.9/93.0 | φ106 × 114L | Equal space | Quadrangular | TWC | 35 | 5 | 1 | OK | B |
| Example 6 | 88.9/93.0 | φ106 × 114L | Equal space | Quadrangular | TWC | 35 | 5 | 2 | OK | B |
| Example 7 | 88.9/93.0 | φ106 × 114L | Equal space | Quadrangular | TWC | 35 | 5 | 3 | OK | A |
| Example 8 | 88.9/93.0 | φ106 × 114L | Equal space | Quadrangular | TWC | 35 | 5 | 5 | OK | A |
| Example 9 | 88.9/93.0 | φ106 × 114L | Equal space | Quadrangular | TWC | 35 | 5 | 6 | OK | A |
| Example 10 | 88.9/93.0 | φ106 × 114L | Equal space | Quadrangular | TWC | 35 | 5 | 10 | OK | B |
| Comparative Example 3 | 88.9/93.0 | φ106 × 114L | Equal space | Quadrangular | TWC | 35 | 5 | 11 | NG | C |
| Example 11 | 88.9/93.0 | φ106 × 114L | Concentration on inflow side | Quadrangular | TWC | 60 | 5 | 3 | OK | AA |
| Example 12 | 88.9/93.0 | φ106 × 114L | Concentration on outflow side | Quadrangular | TWC | 60 | 5 | 3 | OK | A |
| Example 13 | 88.9/93.0 | φ106 × 114L | Equal space | Hexagonal | TWC | 35 | 5 | 3 | OK | A |
| Example 14 | 88.9/93.0 | φ106 × 114L | Equal space | Octagon + quadrangle | TWC | 35 | 5 | 3 | OK | A |
| Comparative Example 4 | 63.5/139.5 | φ106 × 114L | — | Quadrangular | TWC | 35 | 0 | — | OK | — |
| Example 15 | 63.5/139.5 | φ106 × 114L | Equal space | Quadrangular | TWC | 35 | 5 | 3 | OK | AA |
| Comparative Example 5 | 88.9/93.0 | φ106 × 114L | — | Quadrangular | TWC | 60 | 0 | — | OK | — |
| Example 16 | 88.9/93.0 | φ106 × 114L | Equal space | Quadrangular | TWC | 60 | 5 | 3 | OK | A |
| Comparative Example 6 | 88.9/93.0 | φ106 × 114L | — | Quadrangular | TWC | 28 | 0 | — | OK | — |
| Example 17 | 88.9/93.0 | φ106 × 114L | Equal space | Quadrangular | TWC | 28 | 5 | 3 | OK | A |
| Comparative Example 7 | 88.9/93.0 | φ40 × 114L | — | Quadrangular | TWC | 35 | 0 | — | OK | — |
| Example 18 | 88.9/93.0 | φ40 × 114L | Equal space | Quadrangular | TWC | 35 | 5 | 3 | OK | A |
| Comparative Example 8 | 139.7/46.5 | φ356 × 114L | — | Quadrangular | TWC | 35 | 0 | — | OK | — |
| Example 19 | 139.7/46.5 | φ356 × 114L | Equal space | Quadrangular | TWC | 35 | 5 | 3 | OK | A |
| Comparative Example 9 | 88.9/93.0 | φ106 × 50L | — | Quadrangular | TWC | 35 | 0 | — | OK | — |
| Example 20 | 88.9/93.0 | φ106 × 50L | Equal space | Quadrangular | TWC | 35 | 2 | 3 | OK | A |
| Comparative Example 10 | 88.9/93.0 | φ106 × 210L | — | Quadrangular | TWC | 35 | 0 | — | OK | — |
| Example 21 | 88.9/93.0 | φ106 × 210L | Equal space | Quadrangular | TWC | 35 | 5 | 3 | OK | A |
| Comparative Example 11 | 88.9/93.0 | φ106 × 114L | — | Quadrangular | NOx adsorber catalyst + TWC | 60 | 0 | — | OK | — |
| Example 22 | 88.9/93.0 | φ106 × 114L | Equal space | Quadrangular | NOx adsorber catalyst + TWC | 60 | 5 | 3 | OK | A |

What is claimed is:

1. A honeycomb catalyst body comprising:
a tubular honeycomb base material having porous partition walls to define and form a plurality of cells extending as through channels of a fluid from one end surface from which the fluid flows in to the other end surface from which the fluid flows out, the honeycomb base material further having opposite side surfaces extending from the one end surface to the other end surface;
a catalyst loaded onto the partition walls; and
at least two slits passing completely through the honeycomb base material and having first and second openings that are open only in the opposite side surfaces of the honeycomb base material, wherein a width of each slit is from 1.0 to 10.0 mm,
wherein the at least two slits are formed so that the respective slits cross at 90 degrees when viewed from a central axis direction of the honeycomb base material.

2. The honeycomb catalyst body according to claim 1, wherein the width of the slit is from 2.5 to 10.0 mm.

3. The honeycomb catalyst body according to claim 2, wherein slit areas of the slits formed in a region from the one end surface from which the fluid flows in to a central portion in the extending direction of the cells are ⅔ or more of a total of slit areas of all the slits.

4. The honeycomb catalyst body according to claim 2, wherein slit areas of the slits formed in a region from the other end surface from which the fluid flows out to a central portion in the extending direction of the cells are ⅔ or more of a value of a total of slit areas of all the slits.

5. The honeycomb catalyst body according to claim 1, wherein a total of slit areas which are areas of portions cut by the slits in the honeycomb base material is 0.4 times or more and less than 11.0 times as much as an area of a cross section of the honeycomb base material which is perpendicular to an extending direction of the cells.

6. The honeycomb catalyst body according to claim 5, wherein slit areas of the slits formed in a region from the one end surface from which the fluid flows in to a central portion in the extending direction of the cells are ⅔ or more of a total of slit areas of all the slits.

7. The honeycomb catalyst body according to claim 5, wherein slit areas of the slits formed in a region from the other end surface from which the fluid flows out to a central portion in the extending direction of the cells are ⅔ or more of a value of a total of slit areas of all the slits.

8. The honeycomb catalyst body according to claim 1, wherein slit areas of the slits formed in a region from the one end surface from which the fluid flows in to a central portion in the extending direction of the cells are ⅔ or more of a total of slit areas of all the slits.

9. The honeycomb catalyst body according to claim 1, wherein slit areas of the slits formed in a region from the other end surface from which the fluid flows out to a central portion in the extending direction of the cells are ⅔ or more of a value of a total of slit areas of all the slits.

* * * * *